United States Patent [19]

Cohen et al.

[11] Patent Number: 4,756,664
[45] Date of Patent: Jul. 12, 1988

[54] SCAVENGE OIL SYSTEM

[75] Inventors: Mordehy Cohen; James L. Bettenga; Brian Tjenstrom, all of Rockford, Ill.

[73] Assignee: Sundstrand Corporation, Rockford, Ill.

[21] Appl. No.: 17,977

[22] Filed: Feb. 24, 1987

Related U.S. Application Data

[62] Division of Ser. No. 784,325, Oct. 3, 1985, Pat. No. 4,683,984.

[51] Int. Cl.$^4$ .................................................. F01D 25/20
[52] U.S. Cl. ........................................ 415/175; 415/110
[58] Field of Search ................ 415/175, 110, 111, 112

[56] References Cited

U.S. PATENT DOCUMENTS

| | | | |
|---|---|---|---|
| 1,958,145 | 5/1934 | Jones | 415/144 |
| 2,234,777 | 3/1941 | Puffer | 415/112 |
| 2,492,020 | 12/1949 | Thoresen | 184/6.2 |
| 3,442,444 | 5/1969 | Kievit | 415/122 |
| 3,976,165 | 8/1976 | Pilarezyk | 415/110 |
| 4,308,464 | 12/1981 | Yamamoto | 415/175 |

Primary Examiner—Robert E. Garrett
Assistant Examiner—John T. Kwon
Attorney, Agent, or Firm—Wood, Dalton, Phillips, Mason & Rowe

[57] ABSTRACT

The scavenge oil system disclosing the invention has a scavenge oil outlet located at the bottom of a blower housing whereby lubricating oil can flow thereto by gravity in most attitudinal positions of the housing. When the blower housing is in an attitude that a portion thereof, such as the rear, is at a level lower than the scavenge oil outlet, a scavenge pump, having an impeller driven by the blower shaft, is rendered effectively operable by having an inlet beneath the level of oil at the rear of the housing and the scavenge pump pumps the oil to a higher level whereby it may flow from the housing by gravity through either the scavenge oil outlet of the housing or through other passages. The scavenge oil system utilizes passages for oil flow formed as cored passages in the wall of the blower housing to minimize cost and weight addition to the blower and minimizes the power demands on the blower drive, since the scavenge pump will run dry in most attitudes of the blower and will only require power when effectively operating to pump oil to a higher level.

9 Claims, 4 Drawing Sheets

SCAVENGE OIL SYSTEM

This a division of application Ser. No. 784,325 filed Oct. 3, 1985, now U.S. Pat. No. 4,683,984

TECHNICAL FIELD

This invention pertains to a scavenge oil system for scavenging oil from a housing having a number of lubricated components and which can be positioned in a number of different attitudes. In at least one of said attitudes, oil cannot flow by gravity to a scavenge oil outlet at the bottom of the housing.

More particularly, power plants for certain aircraft utilize blowers as either an inlet particle separator or to blow air through an oil cooler, thus cooling the oil, with the blower mountable to either the top or the side of a gearbox. The blower has a housing with various components requiring lubrication, such as a gear mesh, bearings, splines and a dynamic face seal and lubricating oil is directed to those components. The blower can be in any one of several different attitudes wherein gravity flow of the lubricating oil is sufficient to have the oil reach the scavenge oil outlet; however, in at least one attitude of the blower, the scavenge oil outlet is above a part of the housing which can collect lubricating oil which flows thereto by gravity. The inventon disclosed herein provides for scavenging oil in the last-mentioned situation by the provision of a scavenge pump positioned to pump oil from that part of the housing to the scavenge oil outlet as required by the attitude of the blower.

BACKGROUND ART

The delivery of oil to components requiring lubrication and thereafter scavenging the oil is well known in the art.

A prior art search has revealed the following U.S. patents having some relevancy to scavenging of lubricating oil: Jones Pat. No. 1,958,145; Weeks Pat. No. 2,503,016; Syrovy Pat. No. 3,025,672; Bill et al Pat. No. 3,075,349; Luenberger Pat. No. 3,075,690; Venable Pat. No. 3,378,104; Kievit Pat. No. 3,442,444; DeLisse Pat. No. 3,618,710; and DeSalve Pat. No. 4,285,632.

Generally, the foregoing patents relate to scavenge oil systems without any reference to scavenging oil from a housing which may operate in several different attitudes, by use of a scavenge pump which only pumps oil when required by the attitude of the housing. The Venable Pat. No. 3,378,104 discloses an air-oil separator for use in gas turbine engines and makes reference to operation of the aircraft in a steep climb which would change the attitude of the mechanism. The patent refers to scavenging oil during a steep climb or dive of the aircraft to prevent flooding of the gearbox. However, the solution achieved in this patent is by oversizing a scavenge pump and there is oil in the gearbox at all times that can cause churning losses.

The foregoing prior art does not disclose a scavenge oil system for a mechanism, such as a blower associated with a gearbox, wherein lubricating oil is supplied from the gearbox and the scavenged lubricating oil is returned to the gearbox either by gravity flow to the gearbox or, in certain attitudes of the mechanism, by pumping of the oil by a scavenge pump which is not effective to pump oil in those attitudes where the scavenged oil can flow by gravity to a scavenge pump outlet of the mechanism. When the blower is mounted on top of the gearbox, the flow from the scavenge oil outlet back to the gearbox can be by gravity. If the blower is mounted at the side of the gearbox, the scavenge oil outlet of the blower can be connected by passage means to a scavenge pump within the gearbox.

DISCLOSURE OF THE INVENTION

A primary feature of the invention is to provide a scavenge oil system for scavenging oil from a housing having components requiring lubrication and which is operable in different attitudes by associating a scavenge pump with driven mechanism in the housing and locating the scavenge pump to be effective in pumping oil from the housing only in attitudes of the housing wherein the lubricating oil cannot reach a scavenge oil outlet by gravity flow.

In accomplishing the foregoing, the housing, which may be a housing for a blower, has a driven shaft and components within the housing associated with the driven shaft as well as a dynamic face seal which require lubrication. The housing has a scavenge oil outlet at the bottom thereof whereby, in most attitudes of the housing, the lubricating oil can flow by gravity to the scavenge oil outlet and then return to a gearbox associated with the housing either by continued gravity flow or by being pumped to the gearbox by a scavenge pump in the gearbox. The scavenge oil outlet is effective in a normal attitude of the housing wherein the axis of the driven shaft is horizontal and is also effective in other attitudes, such as attitudes where the housing has rotated within a predetermined angle about the axis of the driven shaft and also a nosedown attitude, up to approximately 45°. The scavenge oil outlet is not effective for outflow of oil when the housing is in a nose-up position or attitude wherein the driven shaft is vertical. In this attitude, there is a part of the housing lower than the scavenge oil outlet, which is the rear of the housing when the housing is in the aforesaid normal attitude. A scavenge pump is located within the housing at the rear thereof having an impeller connected for rotation with the driven shaft. In the aforesaid nose-up attitude, the scavenge pump is positioned within the oil collecting in the rear of the housing and can pump this oil out of the housing through suitable passages.

Since the scavenge pump is only effective to pump oil in the aforesaid nose-up attitude, the amount of power used by the scavenge pump is very small. The pump runs dry when the housing is in the other atti- tudes.

An object of the invention is to provide a new and improved scavenge oil system for scavenging oil from a housing that may be operable in several different attitudes, including, the use of a continuously rotating scavenge pump which is only effective to pump oil from the housing in less than all of the attitudes of the housing and which runs dry in the other attitudes to minimize power consumption.

Another object of the invention is to provide a scavenge oil system, as defined in the preceding paragraph which has very low weight and low cost and which is of compact size and highly reliable.

A further object of the invention is to provide a scavenge oil system for a blower for scavenging oil from a blower housing having a driven shaft and which provides for gravity flow of oil to a scavenge oil outlet or alternatively pumping oil from the blower housing by a scavenge pump in at least one attitude of the blower and which is of a compact size and low weight and cost. The compactness is achieved by having the scavenge system packaged inside the blower with cored flow passages in the blower main housing and the scavenge pump housing integrated therewith. The scavenge oil system has very low weight, since the cores are integrated into the blower housing, rather than the flow passages being defined by separate elements and this construction contributes to the low-cost. The scavenge pump is driven by the driven shaft of the blower and is of a simple construction having a radial blade impeller with large flow capacity and with the scavenge pump being constructed of a light composite material and very small.

The scavenge oil system is highly reliable because of its dependence upon gravity and the lack of any use of moving parts, except for the scavenge pump which is mounted directly on the driven shaft of the blower.

An additional object of the invention is to provide a scavenge oil system for scavenging oil from a housing which rotatably mounts a shaft by bearings and has a gear mesh therein for rotating the shaft and a scavenge oil outlet at the bottom of the housing, with the improvement thereto which comprises a scavenge pump in the housing at the rear thereof and having an inlet above the scavenge oil outlet and also having a scavenge pump outlet and passage means connected to said scavenge pump outlet for discharge of pumped oil.

Still another object of the invention is to provide a scavenge oil system, as defined in the preceding paragraph wherein the scavenge pump has an impeller connected to the shaft in the housing to be driven thereby.

A further object of the invention is to provide a blower having a casing having a gas flow passage, a blower housing positioned within said gas flow passage, stator means mounting said blower housing to said casing, a rotatable shaft mounted within said blower housing and having blades secured thereto, bearing means rotatably mounting said rotatable shaft in the blower housing, drive means for said rotatable shaft extending through said stator means, means including a passage through said stator means for delivering lubricating oil to said bearing means, and scavenging means including a scavenge pump and a scavenge oil outlet for scavenging lubricating oil from the blower housing in all operational positions thereof either by gravity flow to the scavenge oil outlet or by gravity flow to the scavenge pump when the lubricating oil does not flow by gravity to the scavenge oil outlet.

Additional objects of the invention are to provide a blower, as defined in the preceding paragraph, wherein the scavenging means includes a passage through the stator means and with passages formed in the walls of the blower housing which communicate with the passage through the stator means and with said passages being formed by cores in the housing.

BEST MODES FOR CARRYING OUT THE INVENTION

Figure 1:
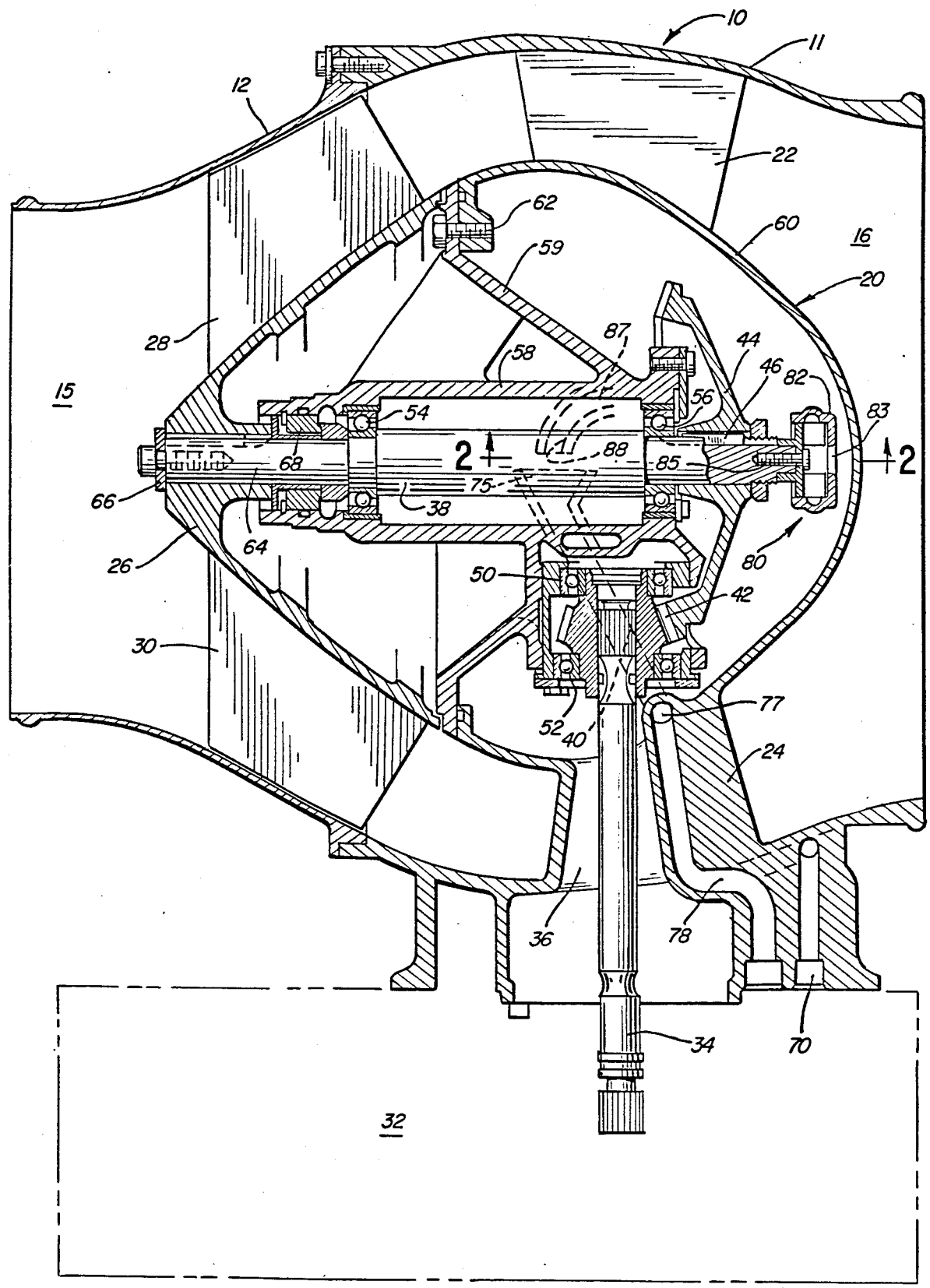
FIG. 1 is a central plan section of a fan or blower usable as an inlet particle separator and shown in association with a gearbox.
Figure 2:
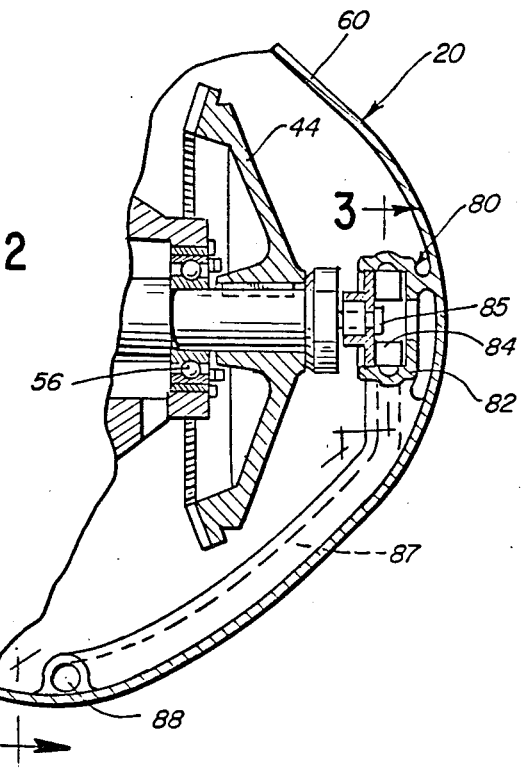
FIG. 2 is a vertical section, taken generally along the line 2—2 in FIG. 1.
Figure 3:
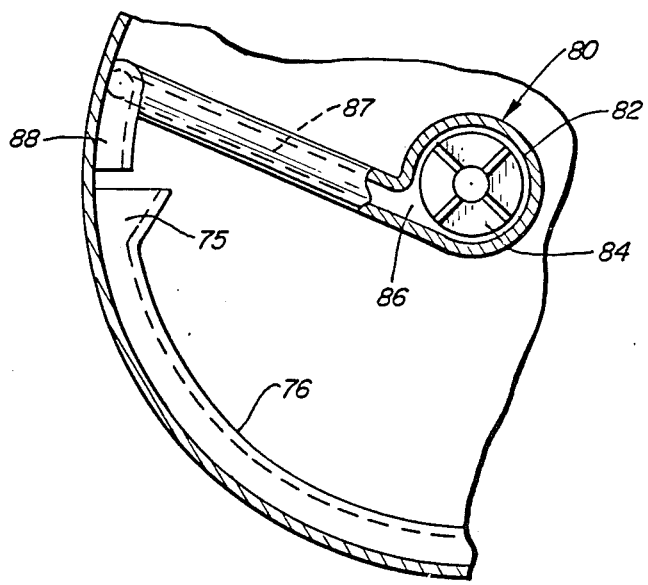
FIG. 3 is a sectional view, taken along the line 3—3 in FIG. 2.

One embodiment of the scavenge oil system is shown in FIGS. 1-3 associated with a blower operable as an inlet particle separator.

A casing, indicated generally at 10, has joined sections 11 and 12 which provide an air inlet 15 to a flow passage leading to an air outlet 16, with the airflow passage being generally annular and defined between the interior of the casing 10 and a blower housing, indicated generally at 20, positioned within the casing and integral therewith by integrally cast stators, two of which are shown at 22 and 24, respectively. A generally conical hub 26 is rotatable relative to the blower housing 20 and carries a plurality of blades, two of which are shown at 28 and 30 for rotation within the airflow passage within the casing.

The blower is shown in FIG. 1 in association with a gearbox 32, indicated by broken line and extends from the side thereof. The gearbox has a gearbox scavenge pump (not shown) and also gearing (not shown) for imparting rotation to a drive means including a drive shaft 34 which extends through a passage 36 in the stator 24 and which is operable through gearing to rotate a rotatable blower shaft 38 in the blower housing 20. More particularly, the drive shaft 34 is splined at 40 to a gear 42 meshing with a gear 44 which is keyed at 46 to the blower shaft 38. The gear 42 is rotatably mounted in bearings 50 and 52, supported by integral structural elements of the blower housing and the blower shaft 38 is supported by bearings 54 and 56 mounted in a tubular blower housing element 58 having integral therewith the components for supporting the bearings 50 and 52 and an integral frusto-conical member 59 which forms part of the blower housing by connection to the part 60 thereof at several circumferential locations, one of which is shown at 62.

The hub 26 is attached to a reduced diameter end 64 of the blower shaft 38 by fastening structure 66 and a dynamic face seal 68 seals the interior of the blower housing 20 from the exterior thereof and, specifically, from the underside of the hub 26.

As well known in the art, it is necessary to provide lubricating oil to the spline 40 and the bearings 50, 52, 54 and 56 as well as to the mesh between the gears 42 and 44 and the dynamic face seal 68. This lubricating oil is supplied to these components from oil pumped from the gearbox 32 which flows through a passage 70 and which communicates with passages, not shown, for delivering lubricating oil to these components. The lubrication of these components is shown more particularly in the embodiment of FIGS. 4 and 5. It is necessary to scavenge this oil from the blower housing and, in the embodiment of FIGS. 1-3, there is a scavenge oil outlet 75 at the bottom of the blower housing having a communicating passage 76, with an outlet end 77 which communicates with a passage 78 leading to the gearbox 32, whereby a gearbox scavenge pump (not shown) within the gearbox can pump oil from the bottom of the blower housing 20.

This scavenging of oil is effective, with the blower housing 20 in a number of different attitudes, including a normal attitude wherein the rotatable shaft 38 is horizontal as well as in attitudes where the blower housing is nose-down up to an angle of 45° and may be in rotational attitudes of up to ±30° rotation around the axis of the blower shaft 38. The blower housing may also have an attitude where it is in a 90° nose-up position with the blower shaft 38 extending vertically and with air flowing downwardly from the inlet 15 to the outlet 16. In this last-mentioned attitude, the scavenge oil outlet 75 is at a higher elevation than portions of the blower housing which will receive lubricating oil by gravity flow. In order to scavenge this oil, a scavenge pump, indicated generally at 80, is positioned at an end of the blower shaft 38 and at the rear of the housing 20.

The scavenge pump 80 has a pump housing 82 integral with the blower housing section 60 with an inlet 83 to a radial blade impeller 84 connected by means 85 to an end of the blower shaft 38. A scavenge pump outlet 86 connects to a passage 87 having an outlet 88 adjacent the scavenge oil outlet 75 whereby oil pumped by the scavenge pump 80 is delivered to the scavenge oil outlet 75 and the oil is scavenged by the scavenge pump in the gearbox. Operation of the scavenge pump in the 90° nose-up attitude can be visualized clearly. It will be understood that the view of FIG. 2 would be rotated 90° clockwise and the view of FIG. 3 rotated 90° counterclockwise from the positions shown to have the scavenge pump 80 lowermost in the views.

The passage 87, as well as the passage 76, are integral with the wall of the blower housing and are cored passages, to thus avoid added piping to provide the passages.

Figure 4:
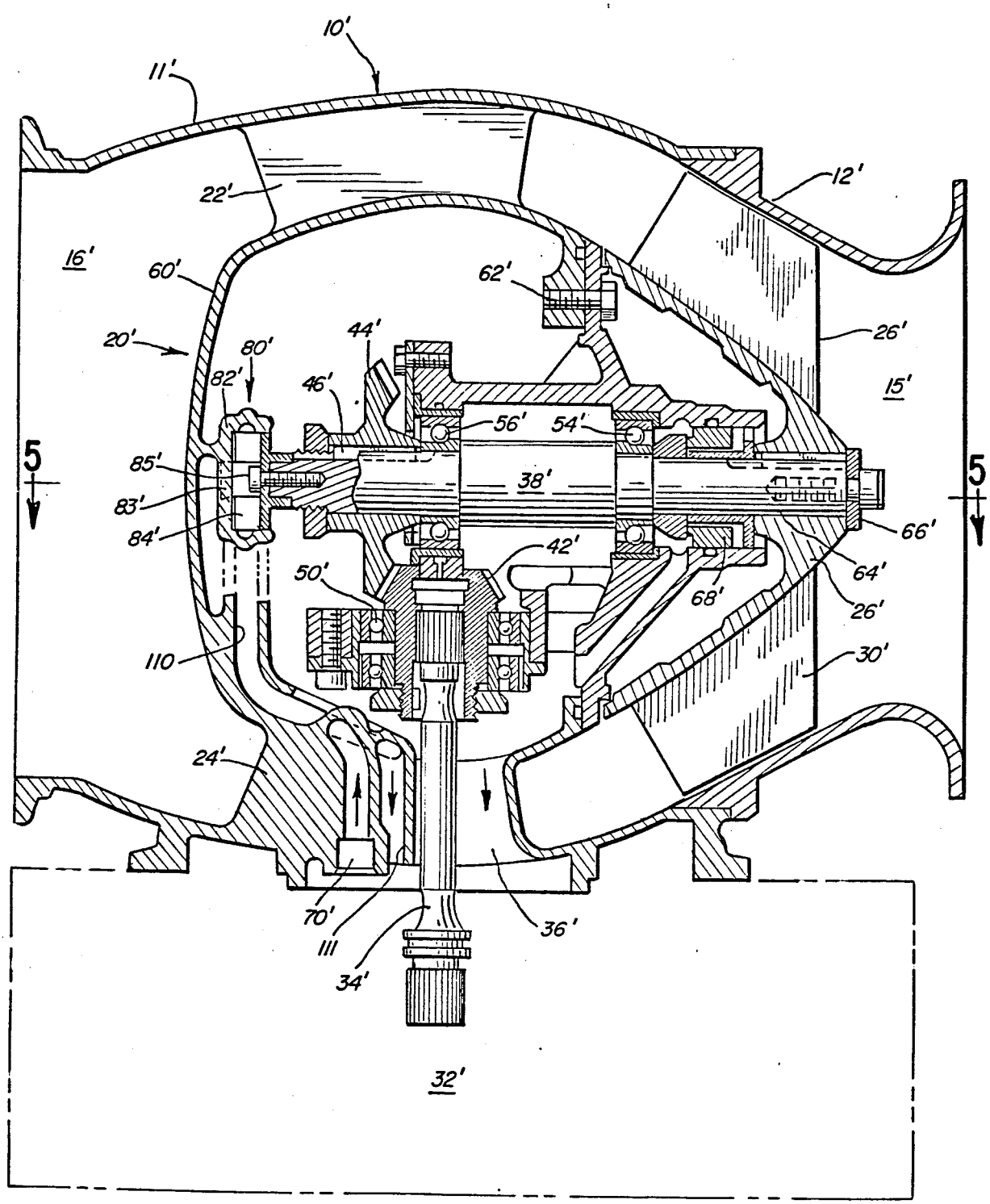
FIG. 4 is a central vertical section of an oil cooler blower shown in association with a gearbox.
Figure 5:
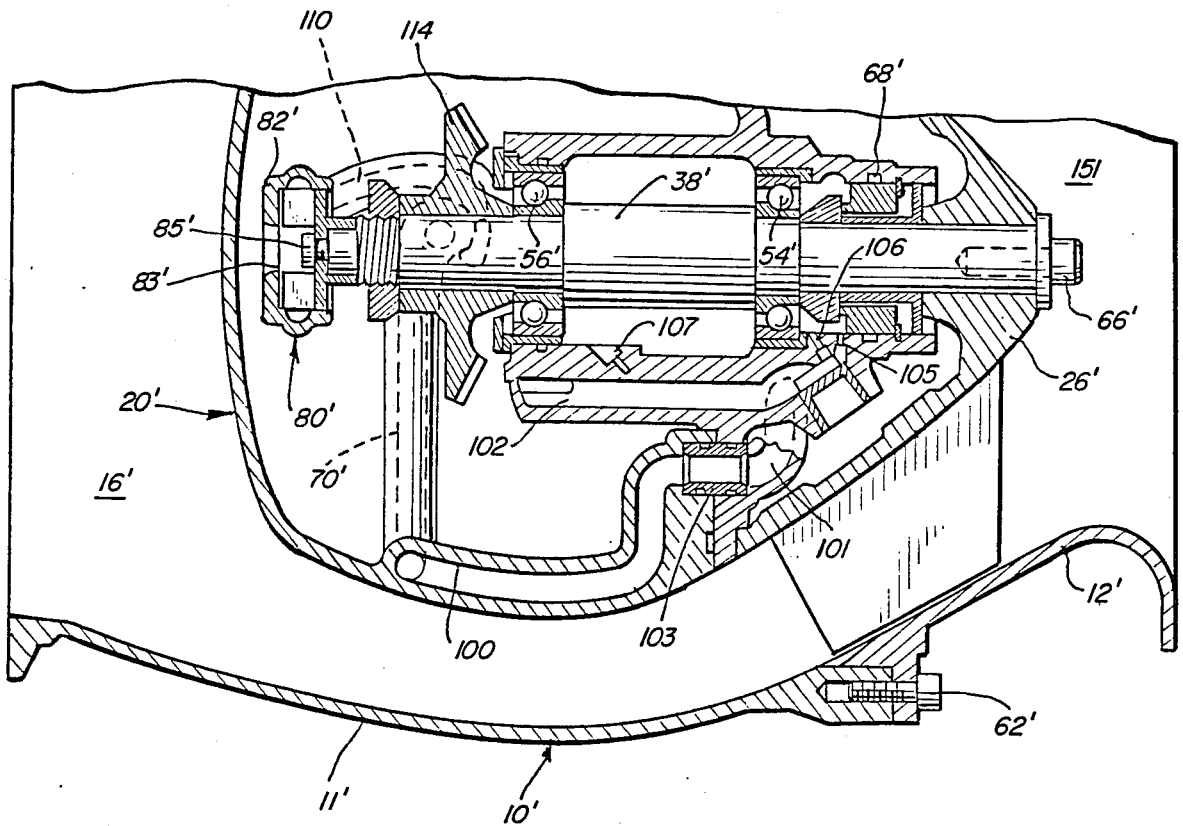
FIG. 5 is a plan section, taken generally along the line 5—5 in FIG. 4.

In the embodiment of FIGS. 4 and 5, an oil cooler blower is illustrated, which is generally of the same construction as the blower illustrated in FIGS. 1 to 3, and the comparable parts in the two embodiments have been given the same reference numeral, with a prime affixed thereto, in the embodiment of FIGS. 4 and 5. In the embodiment of FIGS. 4 and 5, the blower is mounted on top of the gearbox 32' and, thus, the passage 36' through the stator 24' through which the drive shaft 34' extends also defines a scavenge oil outlet whereby in most attitudes of the blower, lubricating oil can flow by gravity to the passage 36' and, thus, return to the gearbox 32'. The blower faces oppositely as compared with FIGS. 1-3 with the inlet 15' on the right.

The lubricating oil supplied from the gearbox through the passage 70' flows through a series of cored passages 100, 101, and 102, as well as a connector 103, with restricted flow passages 105, 106, and 107 communicating with the passage 102 delivering lubricating oil to the dynamic face seal 68', and the bearings 54' and 56', respectively.

As in the embodiment of FIGS. 1 to 3, when the blower is in a 90° nose-up attitude, the passage 36' is above the lowermost part of the blower housing 20' whereby lubricating oil cannot flow by gravity back to the gearbox 32'. The scavenge pump 80', which is located at the rear of the blower housing 20' is, in this attitude, located where the lubricating oil will flow by gravity and the oil can enter the scavenge pump inlet 83' and a scavenge pump outlet connects with a cored passage 110 formed in the wall of the blower housing 20' which has an outlet end 111 opening to the gearbox 32'.

In both of the disclosed embodiments, lubricating oil can be scavenged by gravity flow of the oil to a scavenge oil outlet at the bottom of the blower housing in most attitudes of the blower housing. The blower housing can assume an attitude whereby oil will not flow by gravity to the scavenge oil outlet, but will flow to a part of the housing at a lower level. In both embodiments, a scavenge pump is located to pump the oil which flows to that lower level. The scavenge oil system disclosed results in minimizing power losses, since the scavenge pump 82, 82' runs dry when the blower is in most of its attitudes and only a small amount of power is used when the pump is pumping oil. Additionally, most of the rotating components are kept out of the lubricating oil to minimize churning losses and the velocity of the oil in the scavenge lines is kept low because of the large diameter cored passages to reduce pressure losses.

The scavenge oil system results in minimum blockage to the airflow path from the inlet 15' to the outlet 16' because of the scavenge lines passing through the stators 24 and 24'.

The scavenge oil system does not add to the compact size of the blower housing, since it is packaged inside the blower and the scavenge pump housing and cored passages are integrated with the blower housing. The scavenge oil system is reliable because the lubricating oil flows by gravity at all times, either to a scavenge oil outlet or to a location where the scavenge pump is operable and with the pump being mounted on the blower shaft there is no rubbing contact between the pump and the blower housing. The scavenge oil system is of low weight and low cost, since the cored passages are integrated into the blower main housing, with the scavenge pump being driven by the blower shaft and the scavenge pump being made of a light composite material and very small. The pump has a radial blade impeller which, thus, enables use of the impeller, regardless of the direction of blower shaft rotation and with the scavenge pump having large flow capacity.

We claim:

1. A blower having a casing having a gas flow passage, a blower housing positioned within said gas flow passage, stator means mounting said blower housing to said casing, a rotatable shaft mounted within said blower housing and having blades secured thereto, bearing means rotatably mounting said rotatable shaft in the blower housing, drive means for said rotatable shaft extending through said stator means, means including a passage through said stator means for delivering lubricating oil to said bearing means, and scavenging means including a scavenge pump and a scavenge oil outlet for scavenging lubricating oil from the blower housing in all operational positions thereof either by gravity flow to the scavenge oil outlet or by gravity flow to the scavenge pump when the lubricating oil does not flow by gravity to the scavenge oil outlet.

2. A blower as defined in claim 1 wherein the scavenge pump is connected to said rotatable shaft.

3. A blower as defined in claim 1 wherein said scavenging means includes a passage through said stator means.

4. A blower as defined in claim 3 wherein said scavenging means includes passages formed in the wall of the blower housing which communicate with the passage through said stator means.

5. A blower as defined in claim 1 and positionable in different attitudes, said rotatable shaft and drive means extending horizontally with the scavenge pump at the rear of the blower housing when the blower is in one attitude and said scavenge oil outlet being at the bottom of the blower housing, said blower being positionable in a second attitude with the rear of the blower housing lower than the scavenge oil outlet and passage means in the wall of the blower housing for delivering scavenged oil from the scavenge pump to the scavenge oil outlet when the blower is in said second attitude.

6. A blower as defined in claim 5 wherein said scavenge oil outlet is defined by a cored passage in the wall of the blower housing.

7. A blower as defined in claim 5 wherein said scavenge pump has a pump housing integral with said blower housing, a radial blade impeller rotated by said rotatable shaft, and an opening in said pump housing communicating the rear of the blower housing with the radial blade impeller.

8. A blower as defined in claim 1 and positionable in different attitudes, said rotatable shaft extending horizontally and said drive means extending vertically with the scavenge pump at the rear of the blower housing and said scavenge oil outlet being at the bottom of the blower housing adjacent said drive means when the blower is in one attitude, said blower being positionable in a second attitude with the rear of the blower housing lower than the scavenge oil outlet, and passage means in the wall of the blower housing for delivering scavenged oil from the scavenge pump to the scavenge oil outlet when the blower is in said second attitude.

9. A blower as defined in claim 8 wherein said scavenge pump has a pump housing integral with said blower housing and a radial blade impeller rotated by said rotatable shaft.

* * * * *